United States Patent
Sandquist et al.

(10) Patent No.: US 7,712,440 B2
(45) Date of Patent: May 11, 2010

(54) INCREASED HCCI OPERATION WINDOW

(75) Inventors: H. Sandquist, Lerum (SE); Rob J. Otterspeer, Torslanda (SE)

(73) Assignee: Ford Global Technologies, LLC, Dearborn, MI (US)

( * ) Notice: Subject to any disclaimer, the term of this patent is extended or adjusted under 35 U.S.C. 154(b) by 372 days.

(21) Appl. No.: 11/938,706

(22) Filed: Nov. 12, 2007

(65) Prior Publication Data

US 2008/0173265 A1     Jul. 24, 2008

(30) Foreign Application Priority Data

Nov. 22, 2006    (EP)   ................................. 06124584

(51) Int. Cl.
    *F01L 1/34*      (2006.01)
(52) U.S. Cl. .............. 123/90.15; 123/406.45; 123/435; 123/568.14
(58) Field of Classification Search .............. 123/90.11, 123/90.15, 90.16, 90.17, 90.18, 406.45, 406.58, 123/435, 568.14, 568.21
See application file for complete search history.

(56) References Cited

U.S. PATENT DOCUMENTS

| | | | |
|---|---|---|---|
| 5,050,378 A | | 9/1991 | Clemmens |
| 7,261,085 B2 * | | 8/2007 | Linderyd et al. ............ 123/435 |
| 2001/0015192 A1 | | 8/2001 | Urushihara et al. |
| 2002/0046741 A1 | | 4/2002 | Kakuho et al. |
| 2005/0090966 A1 | | 4/2005 | Strom et al. |
| 2005/0183693 A1 | | 8/2005 | Yang et al. |
| 2006/0196466 A1 | | 9/2006 | Kuo et al. |

FOREIGN PATENT DOCUMENTS

| | | |
|---|---|---|
| DE | 10344426 | 4/2005 |
| EP | 1234961 | 8/2002 |
| EP | 1273770 | 1/2003 |
| WO | WO 2005/019626 | 3/2005 |

* cited by examiner

*Primary Examiner*—Ching Chang
(74) *Attorney, Agent, or Firm*—Allan J. Lippa; Alleman Hall McCoy Russell & Tuttle LLP

(57) ABSTRACT

The present invention relates to an internal combustion engine for motor vehicles. The engine can be operated in homogeneous charge compression ignition (HCCI) combustion mode and in conventional spark ignited (SI) combustion mode. For increasing volumetric efficiency and charge temperature during homogeneous charge compression ignition combustion operation timing, duration and lift of the intake valve and the exhaust valve respectively, being controlled such that an amount of residual exhaust gases is trapped in the cylinder of the engine. An intake valve is opened at a timed moment after top dead center during an induction stroke of the piston such that a pressure wave is generated from an intake manifold into the cylinder. The intake valve is closed at a timed moment before the pressure wave is reflected within the cylinder such that a charge mass of said pressure wave is retained within the cylinder.

18 Claims, 2 Drawing Sheets

INCREASED HCCI OPERATION WINDOW

TECHNICAL FIELD

The present invention relates to an internal combustion engine for motor vehicles. The engine can be operated in homogeneous charge compression ignition (HCCI) combustion mode and in conventional spark ignited (SI) combustion mode. The present invention further relates to a method for controlling such an engine as well as an automotive vehicle comprising such an engine.

BACKGROUND

In order to improve thermal efficiency of gasoline internal combustion engines, lean burn is known to give enhanced thermal efficiency by reducing pumping losses and increasing ratio of specific heats. Generally speaking, lean burn is known to give low fuel consumption and low $NO_x$ emissions. There is however a limit at which an engine can be operated with a lean air/fuel mixture because of misfire and combustion instability as a result of a slow burn. Known methods to extend the lean limit include improving ignitability of the mixture by enhancing the fuel preparation, for example using atomised fuel or vaporised fuel, and increasing the flame speed by introducing charge motion and turbulence in the air/fuel mixture. Finally, combustion by auto-ignition, or homogeneous charge compression ignition, has been proposed for operating an engine with very lean or diluted air/fuel mixtures.

When certain conditions are met within a homogeneous or close to homogenous charge of lean air/fuel mixture during low load operation, homogeneous charge compression ignition can occur wherein bulk combustion takes place initiated simultaneously from many ignition sites within the charge, resulting in very stable power output, very clean combustion and high fuel conversion efficiency. $NO_x$ emissions produced in controlled homogeneous charge compression ignition combustion are extremely low in comparison with spark ignition combustion based on propagating flame front and heterogeneous charge compression ignition combustion based on an attached diffusion flame. In the latter two cases represented by a spark ignition engine and a diesel engine, respectively, the burnt gas temperature is highly heterogeneous within the charge with very high local temperature values creating high $NO_x$ emissions. By contrast, in controlled homogeneous charge compression ignition combustion where the combustion is uniformly distributed throughout the charge from many ignition sites, the burnt gas temperature is substantially homogeneous with much lower local temperature values resulting in very low $NO_x$ emission.

Engines operating under controlled homogeneous charge compression ignition combustion have already been successfully demonstrated in two-stroke gasoline engines using a conventional compression ratio. It is believed that the high proportion of burnt gases remaining from the previous cycle, i.e., the residual content, within the two-stroke engine combustion chamber is responsible for providing the hot charge temperature and active fuel radicals necessary to promote homogeneous charge compression ignition in a very lean air/fuel mixture. In four-stroke engines, because the residual content is low, homogeneous charge compression ignition is more difficult to achieve, but can be induced by heating the intake air to a high temperature or by significantly increasing the compression ratio. This effect can also be achieved by retaining a part of the hot exhaust gas, or residuals, by controlling the timing of the intake and exhaust valves.

Homogeneous charge compression ignition combustion of a gasoline like fuel (or petrol like, or fuel with high octane number) requires a temperature of approximately 1100 K to achieve auto ignition. While it may be possible to operate in the HCCI mode over a significantly wide operating range of engine speeds and load, however only a part load portion of the engine's operational range in conventional spark ignited combustion mode can normally be used for HCCI operation. Using the above solution, relying on exhaust gas from the previous combustion, e.g. through providing a so called negative valve overlap (NVO) where the exhaust valve is arranged to be closed before top dead center during an exhaust stroke of the piston, for retaining exhaust gas from the previous combustion, is known to improve the operating range in HCCI mode.

Furthermore, U.S. Pat. No. 5,050,378 discloses how, in a spark ignition or compression ignition four cycle internal combustion engine, an exhaust expansion chamber is sized to produce a reflected exhaust pressure wave timed to an auxiliary reopening of the exhaust valve after the intake valve has effectively closed. The reflected exhaust pressure wave causes the re-entry into the cylinder of a quantity of intake charge (which has previously been drawn into the expansion chamber) subsequent to the effective filling of the cylinder through the intake valve, the result being a boost in cylinder charge and pressure on the compression stroke of the piston. At engine design speed, the power output of the engine is substantially improved over the power output without the boost in cylinder charge and in compression stroke pressure.

Although the power output of the engine is improved at engine design speed using the solution according to U.S. Pat. No. 5,050,378 from fuel economy and exhaust emission aspects, it is undesirable to allow intake charge to be drawn into the exhaust system.

SUMMARY

An object of the present invention is to provide an improved HCCI internal combustion engine having increased volumetric efficiency and charge temperature during homogeneous charge compression ignition combustion operation, and thus a wider operating range. The internal combustion engine is operable in homogeneous charge compression ignition combustion mode and in conventional spark ignited combustion mode and is provided with at least one cylinder and comprises: an intake manifold; fuel injecting means, for injecting fuel into a combustion chamber, of each cylinder; fuel injection control means, for controlling fuel injection quantity per combustion cycle injected using each said fuel injecting means; a piston, arranged for reciprocating action within the cylinder; at least one intake valve for admitting oxygen containing gas from the intake manifold into the cylinder; at least one exhaust valve for exhausting combusted gases from the cylinder; means for controlling timing, duration and lift of said intake valve and said exhaust valve respectively.

According to a first aspect of the present invention this object is achieved in accordance with the features of claim 1, which specifies that for increasing volumetric efficiency and charge temperature during homogeneous charge compression ignition combustion operation, said means for controlling timing, duration and lift of said intake valve and said exhaust valve respectively being arranged to operate such that an amount of residual exhaust gases is trapped in said cylinder, and the intake valve is arranged to be opened at a timed moment after top dead center during an induction stroke of the piston such that a pressure wave is generated from the intake manifold into the cylinder, and the intake valve is arranged to be closed at a timed moment before the pressure wave is reflected within the cylinder such that a charge mass of the pressure wave is retained within the cylinder.

A further object of the present invention is to provide a method for increasing volumetric efficiency and charge temperature during homogeneous charge compression ignition combustion operation of an internal combustion engine operable in homogeneous charge compression ignition combustion mode and in conventional spark ignited combustion mode. The engine is provided with at least one cylinder and comprises: an intake manifold; fuel injecting means, for injecting fuel into a combustion chamber, of each cylinder; fuel injection control means, for controlling fuel injection quantity per combustion cycle injected using each said fuel injecting means; a piston, arranged for reciprocating action within the cylinder; at least one intake valve for admitting oxygen containing gas from the intake manifold into the cylinder; at least one exhaust valve for exhausting combusted gases from the cylinder; means for controlling timing, duration and lift of the intake valve and the exhaust valve respectively.

According to a second aspect of the present invention this object is achieved in accordance with the features of claim 7, which specifies that the method comprises the steps of, controlling timing, duration and lift of said intake valve and said exhaust valve respectively such that an amount of residual exhaust gases is trapped in said cylinder, and opening the intake valve at a timed moment after top dead center during an induction stroke of the piston such that a pressure wave is generated from the intake manifold into the cylinder, and closing the intake valve at a timed moment before the pressure wave is reflected within the cylinder such that a charge mass of the pressure wave is retained within the cylinder.

Further embodiments are listed in the dependent claims. It will be appreciated that features of the invention are susceptible to being combined in any combination without departing from the scope of the invention as defined by the accompany claims.

BRIEF DESCRIPTION OF THE DRAWINGS

By way of example only, embodiments of the present invention will now be described with reference to the accompanying drawings wherein.

Figure 1:
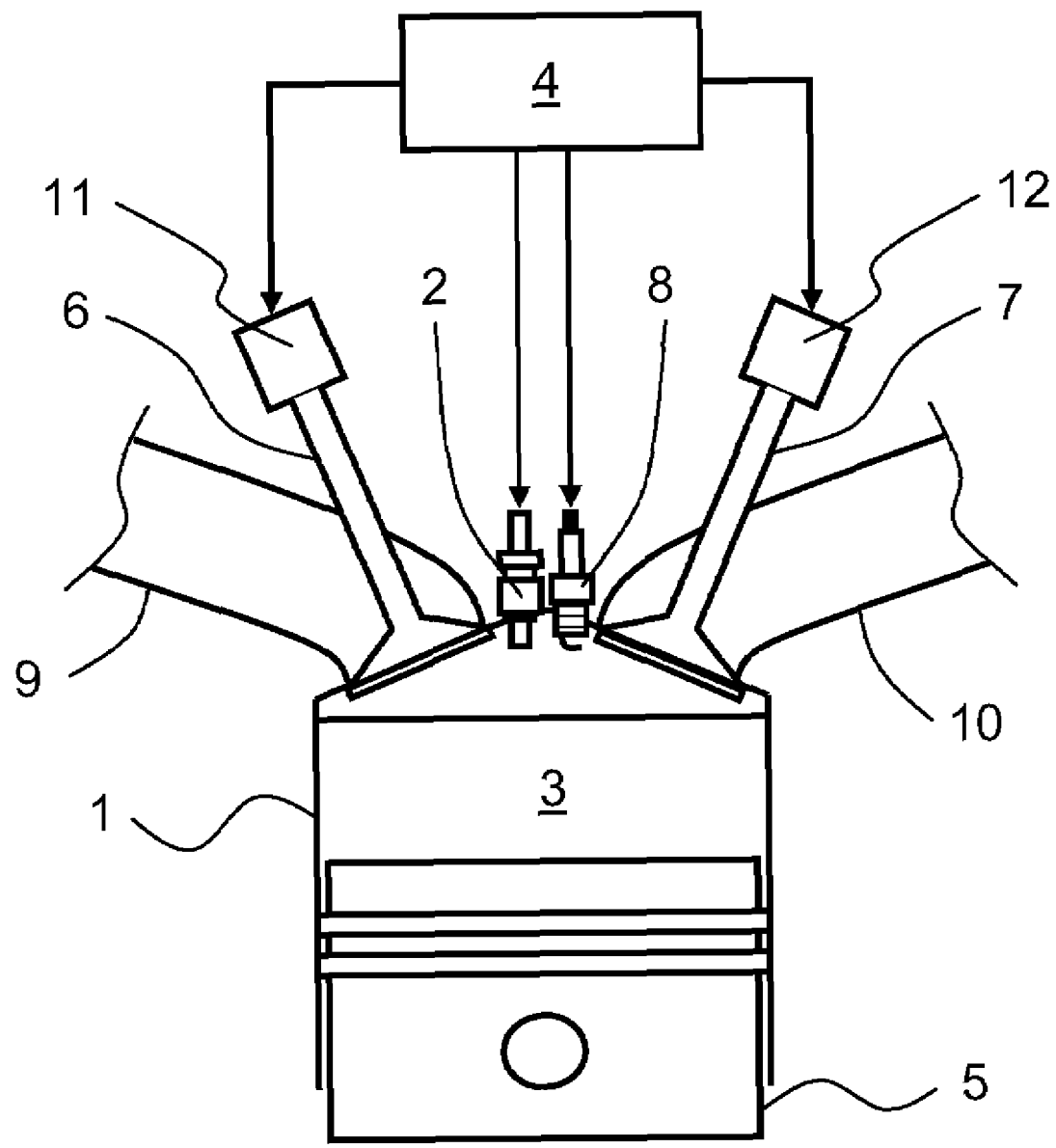
FIG. 1 is a schematic illustration of an internal combustion engine in accordance with the present invention.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein. The same reference numerals will be used for illustrating corresponding features in the different drawings.

DETAILED DESCRIPTION

The invention concerns an internal combustion engine operable in homogeneous charge compression ignition (HCCI) combustion mode and in conventional spark ignited (SI) combustion mode.

For simplicity, the following description will address the present invention in its application to a single cylinder direct-injection gasoline four-stroke internal combustion engine, although it should be appreciated that the present invention is equally applicable to a multi-cylinder direct-injection gasoline four-stroke internal combustion engine, and, in principle, generally applicable to internal combustion engines arranged to operate with two or more stroke schemes.

The engine is possible to be operated in homogeneous charge compression ignition (HCCI) combustion mode. This is a combustion mode, different than conventional spark ignited (SI) combustion mode, in order to reduce fuel consumption in combination with ultra low $NO_x$ emissions. In this mode, a mixture containing fuel, air and combustion residuals is compressed to auto ignition. HCCI combustion is characterized by many exothermal centers and the energy is released in a higher rate compared to combustion with a moving flame front originating from the sparkplug (SI). In order to slow down the heat-release rate the stoichiometric mixture must be diluted with either air (enleanment) or residuals. The dilution rate can be higher compared to an SI engine due to the lack of a moving flame-front. The increased mass reduces the maximum temperature hence increases the thermal efficiency. This reduces both pumping losses and combustion temperature hence the fuel consumption compared to an SI operated engine.

FIG. 1 shows a schematic illustration of an internal combustion engine according to the invention. The engine is provided with at least one cylinder 1 and comprises an intake manifold 9, and fuel injecting means, such as a fuel injector 2, through which fuel is injected into a combustion chamber 3, of each cylinder 1. Fuel injection control means, such as a fuel injection control unit integral to an engine control unit (ECU) 4, controls fuel injection quantity per combustion cycle injected through each fuel injector 2. A piston 5, arranged for reciprocating action within in the engine cylinder 1, has a compression action that during HCCI-mode causes a mixture of air and fuel within the combustion chamber 3 to self ignite. The cylinder 1 is provided with at least one intake valve 6 for admitting oxygen containing gas, such as fresh air, from the intake manifold 9 into the cylinder 1 and at least one exhaust valve 7 for exhausting combusted gases from the cylinder 1. Means 11, 12 are provided for controlling timing, duration and lift of the intake valve 6 and the outlet valve 7 respectively. Air is supplied through an intake conduit of the intake manifold 9, while exhaust gas is exhausted through an exhaust conduit 10 connected to an exhaust system (not shown). When operated in SI-mode, the fuel/air mixture is ignited by a spark plug 8, which is arranged to selectively produce a spark within the combustion chamber 3 under control of ignition control means, which may be integral to the ECU 4.

Gas exchange within the engine is, as described above, controlled by at least one intake valve 6 provided with variable valve timing per cylinder for admitting a combustible oxygen containing gas, such as fresh air, and at least one exhaust valve 7 provided with variable valve timing per cylinder for exhausting combusted gases. The valve timing may be achieved by using suitable fully or partially variable valve systems, variable valve timing (VVT), variable valve lift (VVL), and cam profile switching (CPS).

Combustion residuals may be trapped when operating the engine with a negative valve overlap during homogeneous charge compression ignition combustion operation. The residuals thus trapped increases the temperature of the mixture of intake air and fuel, i.e. the charge temperature, so that auto ignition temperature may be reached before piston top dead center of a subsequent piston compression stroke. The negative valve overlap is achieved when the exhaust valve 7 is closed at a timed moment before top dead center during an exhaust stroke of the piston 5 and the intake valve 6 is opened after top dead center during an induction stroke of the piston 5 in the gas exchange phase of the combustion, such that an amount of residual exhaust gases is retained in the cylinder 1. Thus, the fully variable valve control in accordance with the present invention may be used in order to continuously provide an appropriate amount of combustion residuals for supplying a correct ignition temperature to the charge during HCCI operation.

Combustion residuals may, however, also be trapped using other known residual trapping methods, such as e.g. the so called re-breathing method, which allows the exhaust valve to open during the intake stroke and thus induct previously emitted exhaust gas. Alternatively exhaust gas from another cylinder, in a multi cylinder engine, may be injected into the cylinder, thus providing the necessary exhaust residuals.

In order to increase volumetric efficiency during homogeneous charge compression ignition combustion operation the intake valve 6 is arranged to be opened at a timed moment after top dead center during an induction stroke of the piston 5 such that a pressure wave is generated from the intake manifold 9 into the cylinder 1, due to the decreased cylinder pressure thus achieved. Thereafter the intake valve 6 is arranged to be closed at a timed moment before the thus generated pressure wave is reflected within the cylinder 1, such that the charge mass/volume of the pressure wave is retained within the cylinder 1. Thus, this charge mass is controlled using the variable valve timing for generating a negative pressure in the cylinder 1, which negative pressure is used to initiate a pressure wave from the intake manifold 9 and into the cylinder 1, which will increase the volumetric efficiency when timed correctly.

Preferably the means 11, 12 for controlling timing, duration and lift of the intake valve 6 and the exhaust valve 7 respectively are arranged to control the timed moment at which the exhaust valve 7 is arranged to be closed such that a sufficient amount of residual exhaust gases is retained for providing to the charge a correct ignition temperature for sustaining homogeneous charge compression ignition combustion operation. This may be achieved under the control of the ECU 4 based on operating parameters established in conventional manner well known to the person skilled in the art.

In order to achieve a substantial boost in cylinder charge the means 11, 12 for controlling timing, duration and lift of the intake valve 6 and the exhaust valve 7 respectively are arranged to control the timed moment at which the intake valve 6 is arranged to be opened such that the pressure in the cylinder 1 is reduced sufficiently before the intake valve 6 is opened, for generating an appropriate pressure wave from the intake manifold 9 into the cylinder 1. This may likewise be achieved under the control of the ECU 4 based on operating parameters established in conventional manner well known to the person skilled in the art.

In order to optimize the operational window for HCCI operation of the engine the means 11, 12 for controlling timing, duration and lift of the intake valve 6 and the exhaust valve 7 respectively are arranged to control the timed moments at which the exhaust valve 7 is arranged to be closed and the intake valve 6 is arranged to be opened and thereafter closed such that an optimized charge composition for sustaining homogeneous charge compression ignition combustion operation is obtained. This again may be achieved under the control of the ECU 4 based on operating parameters established in conventional manner well known to the person skilled in the art.

Figure 2:
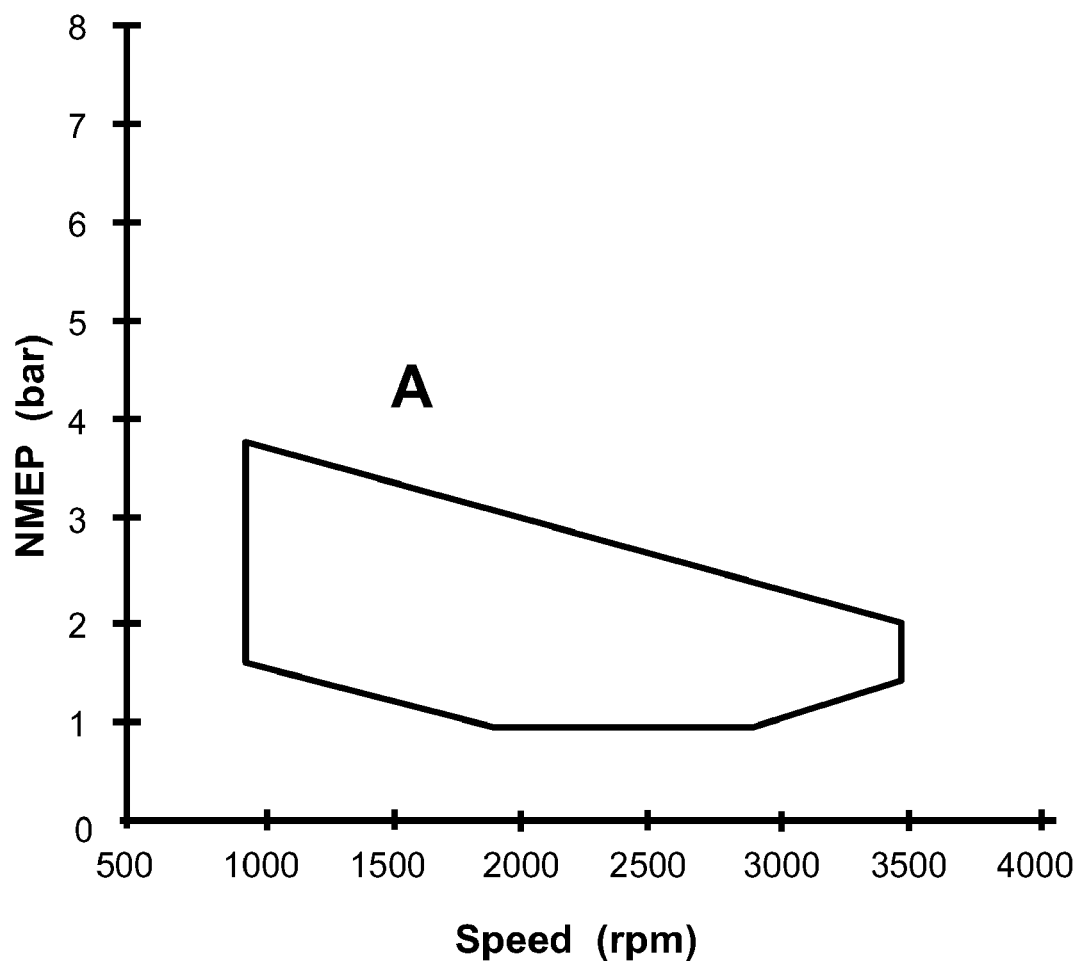
FIG. 2 is a schematic illustration of an operational window of the engine according to FIG. 1 operated in accordance with the present invention.

FIG. 2 schematically shows an operational window of the engine according to FIG. 1, operated in HCCI mode with negative valve overlap. The operational window is normally limited towards area A because combustion becomes too fast, i.e. the pressure rise per crank angle degree is too high, which may cause knocking combustion. Using conventional valve control, having low valve lifts and short intake duration, will cause a low volumetric efficiency, which in combination with an approximately constant amount of residual fraction will cause the dilution ration, i.e. total mixture mass/fuel mass, to decrease. This will result in a temperature increase and hence the rate of heat release and $NO_x$ emissions will increase. These limitations apply to the combustion and therefore govern the maximum net indicated mean effective pressure (NMEP). One way of enlarging the operational window towards higher engine torque would be to increase the displaced volume, i.e. use bigger engines. However, in accordance with the present invention the dilution rate is increased by increasing the volumetric efficiency, with e.g. higher valve lifts and/or optimized intake events and boosting of the intake charge in the manner presented herein, i.e. relying on trapping the pressure wave before it is reflected within the cylinder for boosting the intake charge. The increased charge mass thus provided in accordance with the present invention gives a larger mass to distribute heat to, why heating thereof will be slower, which in turn is beneficial in keeping $NO_x$ emissions down.

The present invention further relates to an automotive vehicle comprising an internal combustion engine according to any one of the above described embodiments.

Furthermore, the present invention also relates to a method for increasing volumetric efficiency and charge temperature during homogeneous charge compression ignition combustion operation of an internal combustion engine operable in homogeneous charge compression ignition combustion mode and in conventional spark ignited combustion mode provided with at least one cylinder 1. The engine 1 comprises: an intake manifold 9; fuel injecting means 2, for injecting fuel into a combustion chamber 3, of each cylinder; fuel injection control means 4, for controlling fuel injection quantity per combustion cycle injected using each of the fuel injecting means; a piston 5, arranged for reciprocating action within the cylinder 1; at least one intake valve 6 for admitting oxygen containing gas from the intake manifold 9 into the cylinder 1; at least one exhaust valve 7 for exhausting combusted gases from the cylinder 1; means 11, 12 for controlling timing, duration and lift of the intake valve 6 and the exhaust valve 7 respectively.

The method in accordance with the present invention comprises the steps of: controlling timing, duration and lift of said intake valve 6 and said exhaust valve 7 respectively such that an amount of residual exhaust gases is trapped in said cylinder 1, and opening the intake valve 6 at a timed moment after top dead center during an induction stroke of the piston 5 such that a pressure wave is generated from the intake manifold 9 into the cylinder 1, and closing the intake valve 6 at a timed moment before the pressure wave is reflected within the cylinder 1 such that the charge mass/volume of the pressure wave is retained in the cylinder 1.

In a further embodiment of the method in accordance with the present invention the method further comprises closing said exhaust valve 7 at a timed moment before top dead center during an exhaust stroke of said piston 5 such that the amount of residual exhaust gases is retained in said cylinder 1.

In a yet further embodiment of the method in accordance with the present invention the method further comprises controlling the timed moment at which the exhaust valve 7 is closed such that a sufficient amount of residual exhaust gases is retained for providing to the charge a correct ignition temperature for sustaining homogeneous charge compression ignition combustion operation.

In a yet further embodiment of the method in accordance with the present invention the method further comprises the step of controlling the timed moment at which the intake valve 6 is opened such that the pressure in the cylinder 1 is reduced sufficiently for generating the pressure wave from the intake manifold 9 into the cylinder 1.

In a still further embodiment of the method in accordance with the present invention the method further comprises the step of controlling the timed moments at which the exhaust valve 7 is closed and the intake valve 6 is opened and thereafter closed such that an optimized charge composition for sustaining homogeneous charge compression ignition combustion operation is obtained within the cylinder 1.

The increased cylinder pressure provided in the cylinder using the principle in accordance with the present invention also results in an increased mixture temperature. Hereby it is possible to reduce the amount of combustion residuals required to achieve auto combustion temperature, e.g. 1100K, which further increases the possibility to increase the engine load.

Furthermore, the opening and/or closing time of the at least one intake valve and/or the at least one exhaust valve may be adjusted based on a temperature of the combustion chamber and/or the differential pressure of the intake manifold and the combustion chamber. In some embodiments, a period of the negative valve overlap may be adjusted based on a temperature of the combustion chamber and an expected mass of the generated pressure wave.

Modifications to embodiments of the invention described in the foregoing are possible without departing from the scope of the invention as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are within the scope of the invention.

Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An internal combustion engine operable in homogeneous charge compression ignition combustion mode and in conventional spark ignited combustion mode provided with at least one cylinder and comprising:
    an intake manifold;
    fuel injecting means, for injecting fuel into a combustion chamber, of each cylinder;
    fuel injection control means, for controlling fuel injection quantity per combustion cycle injected using each said fuel injecting means;
    a piston, arranged for reciprocating action within said cylinder;
    at least one intake valve for admitting oxygen containing gas from said intake manifold into said cylinder;
    at least one exhaust valve for exhausting combusted gases from said cylinder;
    means for controlling timing, duration and lift of said intake valve and said exhaust valve respectively; and
    characterized in that for increasing volumetric efficiency and charge temperature during homogeneous charge compression ignition combustion operation, said means for controlling timing, duration and lift of said intake valve and said exhaust valve respectively being arranged to operate such that an amount of residual exhaust gases is trapped in said cylinder; said intake valve is arranged to be opened at a timed moment after top dead centre during an induction stroke of said piston such that a pressure wave is generated from said intake manifold into said cylinder, and said intake valve is arranged to be closed at a timed moment before said pressure wave is reflected within said cylinder such that a charge mass of said pressure wave is retained within said cylinder.

2. The internal combustion engine according to claim 1, characterised in that said means for controlling timing, duration and lift of said intake valve and said exhaust valve respectively being arranged to operate such that said exhaust valve is arranged to be closed at a timed moment before top dead centre during an exhaust stroke of said piston such that the amount of residual exhaust gases is trapped and retained in said cylinder.

3. The internal combustion engine according to claim 2, characterised in that said means for controlling timing, duration and lift of said intake valve and said exhaust valve respectively are arranged to control said timed moment at which said exhaust valve is arranged to be closed such that a sufficient amount of residual exhaust gases is retained for providing a correct ignition temperature for sustaining homogeneous charge compression ignition combustion operation.

4. The internal combustion engine according to any one of claim 3, characterised in that said means for controlling timing, duration and lift of said intake valve and said exhaust valve respectively are arranged to control said timed moment at which said intake valve is arranged to be opened such that pressure in said cylinder is reduced sufficiently for generating said pressure wave from said intake manifold into said cylinder.

5. The internal combustion engine according to claim 2, characterised in that said means for controlling timing, duration and lift of said intake valve and said exhaust valve respectively are arranged to control said timed moments at which said exhaust valve is arranged to be closed and said intake valve is arranged to be opened and thereafter closed such that an optimized charge composition for sustaining homogeneous charge compression ignition combustion operation is obtained.

6. A method for increasing volumetric efficiency and charge temperature during homogeneous charge compression ignition combustion operation of an internal combustion engine operable in homogeneous charge compression ignition combustion mode and in conventional spark ignited combustion mode provided with at least one cylinder and comprising: an intake manifold; fuel injecting means, for injecting fuel into a combustion chamber, of each cylinder; fuel injection control means, for controlling fuel injection quantity per combustion cycle injected using each said fuel injecting means; a piston, arranged for reciprocating action within said cylinder; at least one intake valve for admitting oxygen containing gas from said intake manifold into said cylinder; at least one exhaust valve for exhausting combusted gases from said cylinder; means for controlling timing, duration and lift of said intake valve and said exhaust valve respectively; the method comprising:

controlling timing, duration and lift of said intake valve and said exhaust valve respectively such that an amount of residual exhaust gases is trapped in said cylinder;

opening said intake valve at a timed moment after top dead centre during an induction stroke of said piston such that a pressure wave is generated from said intake manifold into said cylinder; and closing said intake valve at a timed moment before said pressure wave is reflected within said cylinder such that a charge mass of said pressure wave is retained within said cylinder.

7. The method according to claim 6, further comprising: closing said exhaust valve at a timed moment before top dead centre during an exhaust stroke of said piston such that the amount of residual exhaust gases is retained in said cylinder.

8. The method according to claim 7, further comprising: controlling said timed moment at which said exhaust valve is closed such that a sufficient amount of residual exhaust gases is retained for providing a correct ignition temperature for sustaining homogeneous charge compression ignition combustion operation.

9. The method according to claim 7, further comprising: controlling said timed moments at which said exhaust valve is closed and said intake valve is opened and thereafter closed such that an optimized charge composition for sustaining homogeneous charge compression ignition combustion operation is obtained within said cylinder.

10. The method according to claim 6, further comprising: controlling said timed moment at which said intake valve is opened such that pressure in said cylinder is reduced sufficiently for generating said pressure wave from said intake manifold into said cylinder.

11. A method for extending a homogeneous charge compression ignition combustion operating region of a internal combustion engine having an intake manifold in fluid communication with at least one cylinder, the at least one cylinder including a combustion chamber provided with a reciprocating piston, at least one intake valve for admitting oxygen containing gas from the intake manifold into the at least one cylinder, and at least one exhaust valve for exhausting combusted gases from the at least one cylinder, the method comprising:

during homogeneous charge compression ignition operation, generating a pressure wave flowing into the combustion chamber of the at least one cylinder by opening the at least one intake valve during an induction stroke of the piston;

closing the at least one intake valve at a time prior to the pressure wave reflecting off a side wall of the combustion chamber;

retaining a charge mass of the generated pressure wave in the combustion chamber; and performing a compression stroke to auto ignite the charge mass retained in the combustion chamber.

12. The method according to claim 11, wherein the opening time of the at least one intake valve is adjusted based on a temperature of the combustion chamber.

13. The method according to claim 12, wherein the at least one intake valve is a variable valve lift intake valve and the opening time of the at least one intake valve is adjusted by adjusting the amount of valve lift.

14. The method according to claim 11, wherein the closing time of the at least one exhaust valve is adjusted based on a differential pressure of the intake manifold and the combustion chamber.

15. The method according to claim 14, wherein the at least one exhaust valve is a variable valve lift exhaust valve and the closing time of the at least one exhaust valve is adjusted by adjusting the amount of valve lift.

16. The method according to claim 11, further comprising: prior to generating the pressure wave, closing the at least one intake valve and the at least one exhaust valve to create a negative valve overlap before the piston reaches a top dead center position at an exhaust stroke to retain combustion residuals and create a negative pressure in the combustion chamber.

17. The method according to claim 16, wherein a period of the negative valve overlap is adjusted based on a temperature of the combustion chamber and an expected mass of the generated pressure wave.

18. The method according to claim 16, wherein the internal combustion engine includes a cam profile switching system and the negative valve overlap is performed by changing at least one profile of at least one camshaft.

* * * * *